(12) United States Patent
Molnar et al.

(10) Patent No.: US 6,406,662 B1
(45) Date of Patent: Jun. 18, 2002

(54) ROTARY HEARTH FURNACE WITH CHARGE SLOT AIR SHIELD

(75) Inventors: Daniel A. Molnar, Perrysburg; Lawrence D. Proshek, Toledo, both of OH (US)

(73) Assignee: Maumee Research & Engineering, Incorporated, Northwood, OH (US)

( * ) Notice: Subject to any disclaimer, the term of this patent is extended or adjusted under 35 U.S.C. 154(b) by 0 days.

(21) Appl. No.: 09/591,563

(22) Filed: Jun. 9, 2000

(51) Int. Cl.[7] ................................................ C21B 7/16
(52) U.S. Cl. ...................... 266/176; 266/171; 266/200; 432/250
(58) Field of Search ............................. 266/200, 171, 266/176; 432/250

(56) References Cited

U.S. PATENT DOCUMENTS

| | | | |
|---|---|---|---|
| 890,252 A | * 6/1908 | Thompson | ................... 432/250 |
| 2,977,106 A | * 3/1961 | Duff | ............................ 432/250 |
| 4,622,905 A | 11/1986 | MacDougall et al. | |
| 4,867,677 A | 9/1989 | Ulinski | |
| 5,308,046 A | 5/1994 | Coble | |
| 5,310,338 A | 5/1994 | Harding | |
| 5,895,215 A | 4/1999 | Rinker et al. | |

* cited by examiner

Primary Examiner—Scott Kastler
(74) Attorney, Agent, or Firm—MacMillan, Sobanski & Todd, LLC

(57) ABSTRACT

An apparatus for charging feed material through an opening into a furnace has a fixed structure and a moveable door. The moveable door together with the fixed structure defines the opening. The moveable door is mounted for movement toward and away from the fixed structure to widen and narrow the opening. The moveable door is biased toward the fixed structure. The moveable door and the fixed structure create a V-shaped downwardly pointing channel to direct the feed material being fed through the opening by gravity.

12 Claims, 5 Drawing Sheets

US 6,406,662 B1

ROTARY HEARTH FURNACE WITH CHARGE SLOT AIR SHIELD

TECHNICAL FIELD

This invention relates to a method of increasing the efficiency of introducing material into a furnace for treatment. Specifically, the invention relates to a method of decreasing the amount of ambient air entering a furnace.

BACKGROUND OF THE INVENTION

A rotary hearth furnace is a continuous heating furnace generally having a refractory roof supported by a ring-shaped inner refractory wall that is surrounded by a ring-shaped outer refractory lined wall. The inner wall and the outer wall form a circular hearth path along which a rotating hearth travels. The rotating hearth generally consists of a support plate including a top of refractory material and having side elevations. The rotary hearth furnace is heated by a plurality of burners placed around the path of travel of the rotating hearth.

Feed material to be treated in the furnace is typically loaded, or dropped, from a feed material charger through gaps in the roof of the furnace. A feed material charger for use in a rotary hearth furnace is described in U.S. Pat. No. 5,895,215 and incorporated herein by reference.

Iron oxide and other metallic oxide material can be reduced by a direct reduction processes. A direct reduction process includes heating the metallic oxide material, particularly when it is in a pelletized or briquetted form. Metallic oxides which can be reduced are principally of the iron group, i.e., iron, cobalt and nickel oxides. These oxides and the metals themselves have a high melting temperature and are readily reduced using carbonaceous reductants. Preferably the reductant for these oxides is finely divided coal or coke used in an amount somewhat in excess of the stoichiometric amount required for reduction. Heating can by accomplished by introducing gaseous fueled flames to a temperature within the range of from about 1800 degrees F. to about 2600 degrees F. The heating can be done in a furnace, such as a rotary hearth furnace.

A rotary hearth furnace includes a slowly moving rotary hearth, upon which the material to be heated rests. The material is introduced though an opening in the furnace at one or more points along the rotary hearth's trajectory. Before the rotary hearth is able to complete one revolution, the material is treated and then removed from the rotary hearth's surface. While the rotary hearth is rotating, the metallic oxide material is exposed to heat. The heat can be in the form of a multiplicity of burners.

A number of challenges are encountered in reducing metallic oxide material in rotary hearth furnaces. One challenge is the presence of excess oxygen in the furnace. Since ambient air contains oxygen, it is desirous to minimize the amount of ambient air in the rotary hearth furnace. Rotary hearth furnaces are typically operated such that the interior of the furnace is at a negative pressure. Uncontrolled conditions inside the furnace increases the negative pressure, drawing ambient air into the furnace.

Another challenge is maintaining a relatively constant time versus temperature exposure of the metallic oxides to the heat source. A relatively uniform reduction of metallic oxide requires a relatively uniform exposure of the metallic oxide material to the heating source over a given time. An even distribution of metallic oxide material onto the rotary hearth provides a superior reduction product. The depth of metallic oxide material loaded onto the rotary hearth should be as uniform as possible.

Uniformity in the reduction product can also be facilitated by maintaining uniformity in size and shape of the metallic oxide material. Typically, the metallic oxide material is in the form of roughly spherical pellets within the range of from about 1 to about 3 cm. in diameter. Alternatively other shapes of agglomerates can also be used, for example, brick, briquette, or other suitable shapes.

SUMMARY OF THE INVENTION

The above objects as well as other objects not specifically enumerated are achieved by an apparatus for charging feed material through an opening into a furnace having a fixed structure oriented at an acute angle to the vertical and a moveable door. The moveable door together with the fixed structure defines the opening. The moveable door is mounted for movement toward and away from the fixed structure to widen and narrow the opening. The moveable door is biased toward the fixed structure. The moveable door and the fixed structure create a V-shaped downwardly pointing channel to direct the feed material being fed through the opening by gravity.

According to this invention there is also provided an apparatus for charging feed material into a rotary furnace comprising a rotary furnace roof, a feed material charger and an opening in the rotary hearth roof. The feed material charger is positioned above the rotary furnace roof for charging the feed material to the rotary furnace. The opening in the rotary hearth roof accepts the feed material into the rotary furnace. The opening is defined by a series of moveable doors together with the fixed structure. The moveable doors are mounted for movement toward and away from the fixed structure to widen and narrow the opening. The moveable door is biased toward the fixed structure by a counterweight.

According to this invention there is also provided an apparatus for charging feed material through an opening into a furnace having a first moveable door and a second moveable door which, together with the first moveable door, defines the opening. The first moveable door and second moveable door are biased toward each other.

Various objects and advantages of this invention will become apparent to those skilled in the art from the following detailed description of the preferred embodiment, when read in light of the accompanying drawings.

DETAILED DESCRIPTION OF THE INVENTION

Preliminarily, it should be noted that certain terms used herein, such as "upper", "lower", "top", "bottom", "above", "below", and "behind" are used to facilitate the description of the preferred embodiment of the invention. Unless otherwise specified or made apparent by the context of the discussion, such terms should be interpreted with reference to the figure under discussion. Such terms are not intended as a limitation on the position in which the device may be used.

Figure 1:
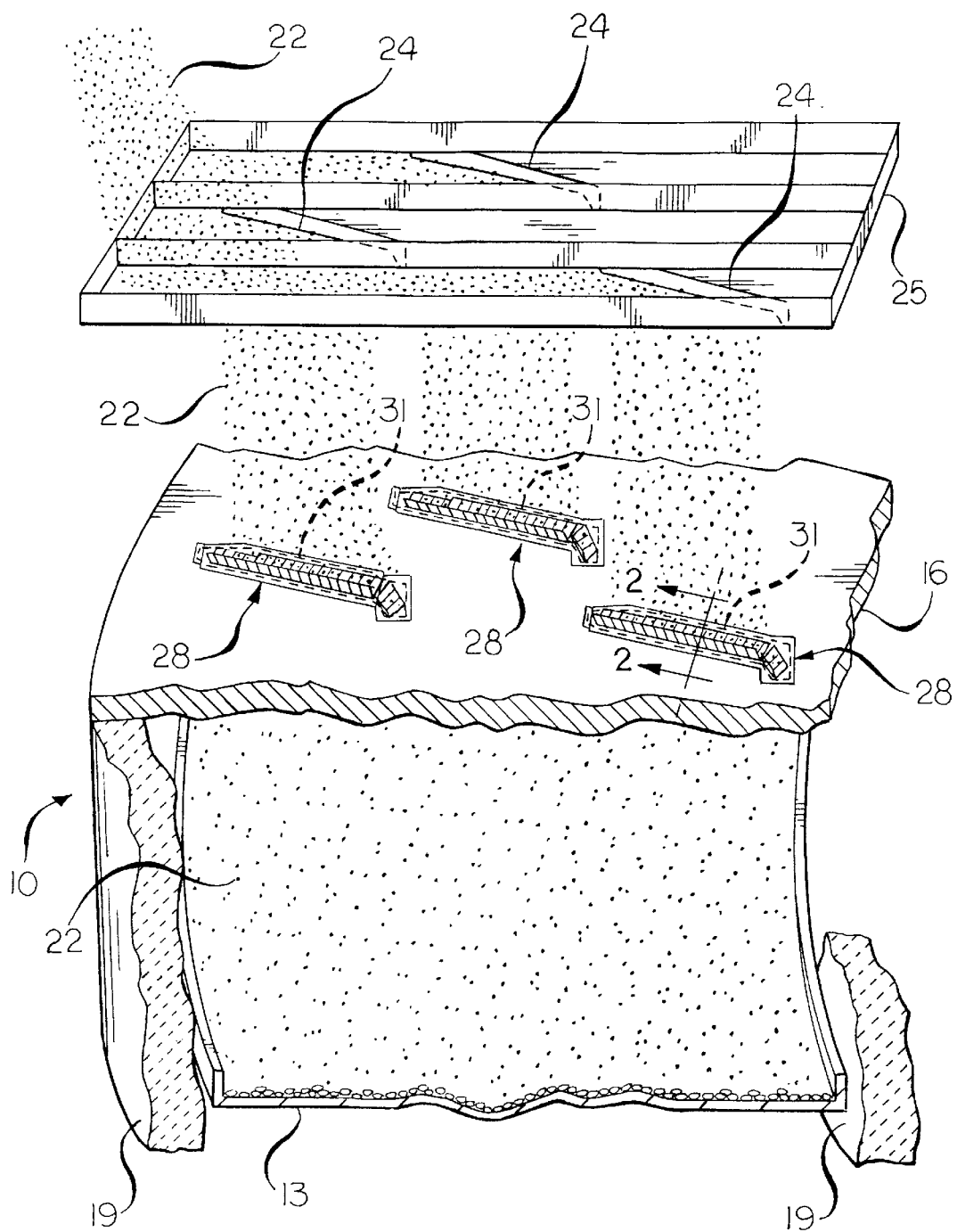
FIG. 1 is a perspective top view of a section of a rotary hearth furnace according to the invention.

As shown in FIG. 1, the rotary hearth furnace 10 includes a circular surface, or rotary hearth 13, which typically rotates at a relatively constant rate under a furnace roof 16 and within furnace walls 19. The furnace roof 16 is supported by the furnace walls 19. The material to be reduced, or feed material 22, is fed from a supply source, not shown, and drops from slots 24 formed in a feed material charger 25. The feed material 22 has a length preferably within the range of from about 1.5 to about 2 inches, a width preferably within the range of from about 0.5 to about 1.5 inches, and a thickness preferably within the range of from about 0.5 to about 1.5 inches. The feed material charger 25 can be of the type shown in U.S. Pat. No. 5,895,215. The feed material charger 25 extends transversely over the width of furnace roof 16 and, in a preferred embodiment is slightly less wide than the furnace roof 16. In a preferred embodiment, the width of the feed material charger 25 is within the range. of from about 14 to about 18 feet.

Figure 2:
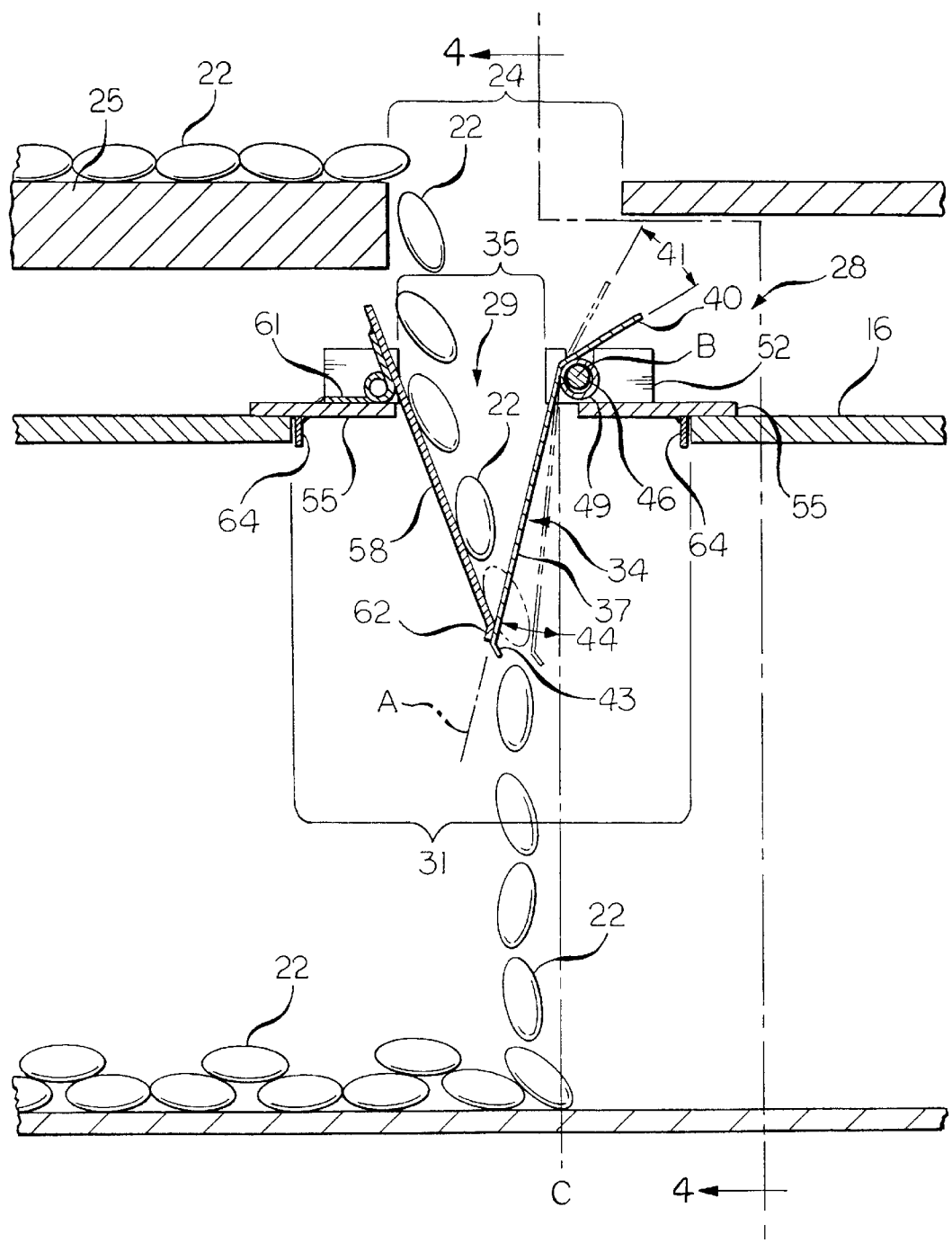
FIG. 2 is a cross-sectional view in elevation of a charge slot air shield apparatus taken along line 2—2 of FIG. 1.

The feed material 22 continues to drop through a charge slot air shield apparatus 28 covering an opening or roof gap 31 in the furnace roof 16. In a preferred embodiment the charge slot air shield apparatus 28 is positioned nearly directly below the slot 24 formed in the feed material charger 25. The distance between the bottom of the feed material charger 25 and the top of the furnace roof 16 is preferably within the range of from about 2 inches to about 12 inches. The feed material 22 continues to drop until it reaches about the level of the rotary hearth 13. The distance between the furnace roof 16 and the rotary hearth 13 is preferably within the range of from about 2 to about 5 feet. When the feed material 22 reaches about the level of the rotary hearth 13, it may contact other feed material 22 on the rotary hearth 13 or the rotary hearth 13 itself As shown in FIG. 2 the charge slot air shield apparatus 28 is preferably a generally V-shaped downwardly pointing channel 29 to direct the feed material being fed through the opening by gravity. The slot air shield apparatus 28 includes at least one moveable door 34 which, together with a fixed door 58, covers an opening 35 in the roof 16. In a preferred embodiment, the moveable door 34 includes 3 contiguous generally flat plates. A second leg 37 extends along axis "A" and joins a first leg 40 and a third leg 43. The second leg 37 and the first leg 40 are not parallel, but rather are at an acute angle to each other. The purpose of the first leg 40 is to funnel feed material 22 as it falls on a downward trajectory from the feed material charger 25 through slots 24. This helps prevent the feed material 22 from falling onto the furnace roof 16. The angle 41 and length of first leg 40 can be adjusted or eliminated to facilitate funneling of the feed material 22 into the opening 35 through the charge slot air shield apparatus 28. The third leg 43 provides structural integrity to the second leg 37 and is not essential to practice of the invention. It should be understood that the moveable door 34 may also be one single plate and include a bent upper portion analogous to the first leg 40 and a bent lower portion analogous to the third leg 43.

The moveable door 34 is opened when not in a closed position. In a preferred embodiment, the moveable door 34 is mounted for pivoting about a pivot point "B." It should be understood that the moveable door 34 may moved by a spring mechanism, sliding mechanism, or any other suitable mechanism. Because the furnace heat shortens spring effectiveness, spring mechanisms are generally not preferred. The pivot point "B" is at about the center of a door support rod 46 centrally disposed within a hollow cylindrical sleeve 49 which rests in a door support bracket 52. The door support bracket 52 is associated with a mounting plate 55 which rests on the furnace roof 16. The sleeve 49 is connected to both the second leg 37 and first leg 40. These two plates can be connected to each other.

The moveable door 34 is biased toward the closed position. In a preferred embodiment, the bias is created by the weight of the first leg 40. The first leg 40 is a counterweight. The moveable door 34 is in closed position when in contact with the fixed door 58. Movement of the moveable door 34 toward the fixed door 58 narrows or eliminates the opening 35. It should be understood that the fixed door 58 can be any fixed structure that the moveable door 34 can contact to close the opening 35. The fixed structure, including the fixed door 58, is preferably oriented at an acute angle to the vertical, such as the vertical axis "C". The eventual thermal expansion of the fixed door 58 favors an arrangement in which each moveable door 34 is contacting a separate fixed door 58. The moveable door 34 is also considered in its closed position either when in contact with the fixed door 58, or in contact with coatings on the fixed door 58. In operation, the moveable door 34 and fixed door 58 could be coated with soot, powdered metallic oxides, or other material. In a preferred embodiment, the fixed door 58 is attached to a mounting plate 55 by a clip 61, preferably by welding. The fixed door 58 may have a flange 62 for structural integrity at its lower end. In the closed position, the fixed door 58 is engaged by the moveable door 34 at about the junction between the third leg 43 and second leg 37 of the moveable door 34. The flange 62 also functions to enhance the engagement with the moveable door 34, preferably making the engagement air-tight. The upper end of the fixed door 58 should be positioned under the feed material charger 25 to facilitate funneling of feed material 22 into the opening 35 through the charge slot air shield apparatus 28 and to prevent feed material 22 from falling onto the furnace roof 16.

When feed material 22 falls through the opening 35 and contacts the moveable door 34 in its closed position, the weight of the feed material 22 causes the moveable door 34 to pivot about pivot point "B" away from the fixed door 58. When the moveable door 34 moves away from the fixed door 58, the opening 35 is widened. The moveable door 34 thus moves from the closed position to the opened position. The feed material 22 can also strike the moveable door 34 in the opened position, causing the moveable door 34 to remain in the opened position or to open even further. The pivoting of the moveable door 34 about pivot point "B" causes the second leg 37 to deviate from the closed position, where the second leg 37 is collinear with axis "A". Vertical axis "C" forms an angle 44 with second leg 37. The pivoting of the moveable door 34 about pivot point "B" also causes angle 44 to decrease.

The charge slot air shield apparatus 28 defines the opening 35 positioned within the roof gap 31. The charge slot air shield apparatus 28 may be positioned or repositioned laterally with respect to the feed material charger 25 within the roof gap 31 so that the feed material 22 drops within the opening 35. One or more keeper tabs 64 can be affixed to the bottom surface of one or more of the mounting plates 55 to limit or eliminate lateral movement of the charge slot air shield apparatus 28. The mounting plates 55 and keeper tabs 64 can be welded or otherwise attached to the furnace roof 16.

Figure 3:
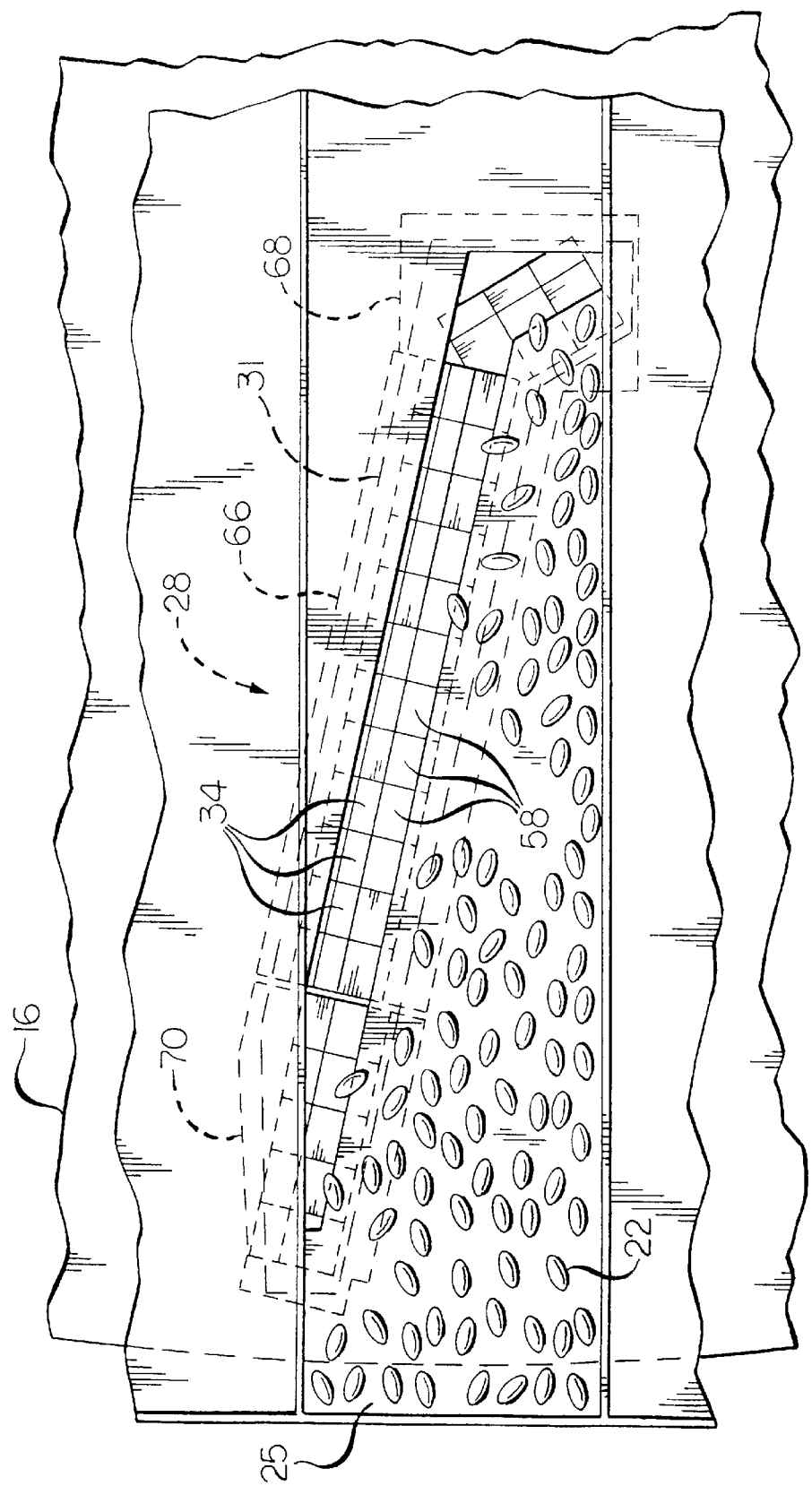
FIG. 3 is an top view of the feed material charger partially cut away to show a furnace roof.

As shown in FIG. 3, feed material charger 25 is positioned above the furnace roof 16. Below the feed material charger 25 is the charge slot air shield apparatus 28 above the roof gap 31. The charge slot air shield apparatus 28 can include a series of adjacent, separately pivotable moveable doors 34. In a preferred embodiment each moveable door 34 in the closed position contacts an individual fixed door 58. The invention may also be practiced by having two or more moveable doors 34 contact a given fixed door 58 when in the closed position.

The invention can be practiced by retrofitting one or more charge slot air shield apparatuses 28 into an existing rotary hearth furnace 10. In a preferred embodiment, 3 charge slot air shield apparatuses 28 are placed in a configuration that accommodates the shape and placement of an existing feed material charger 25 and furnace roof 16. As shown, the charge slot air shield apparatus 28 can be configured in the form of a main section 66 and a dogleg section 68 to accommodate the shape of existing feed material slots 24. The main section 66 can also have an auxiliary section 70. As an example, the auxiliary section 70 can be provided with 5 moveable doors 34, the main section 66 can be provided with 12 moveable doors 34, and the dogleg section 68 can be provided with 3 moveable doors 34, as shown. It will be appreciated that the charge slot air shield apparatus 28 can be placed along a single axis or in any other suitable configuration which facilitates the movement of the feed material 22 through the opening 35.

Figure 4:
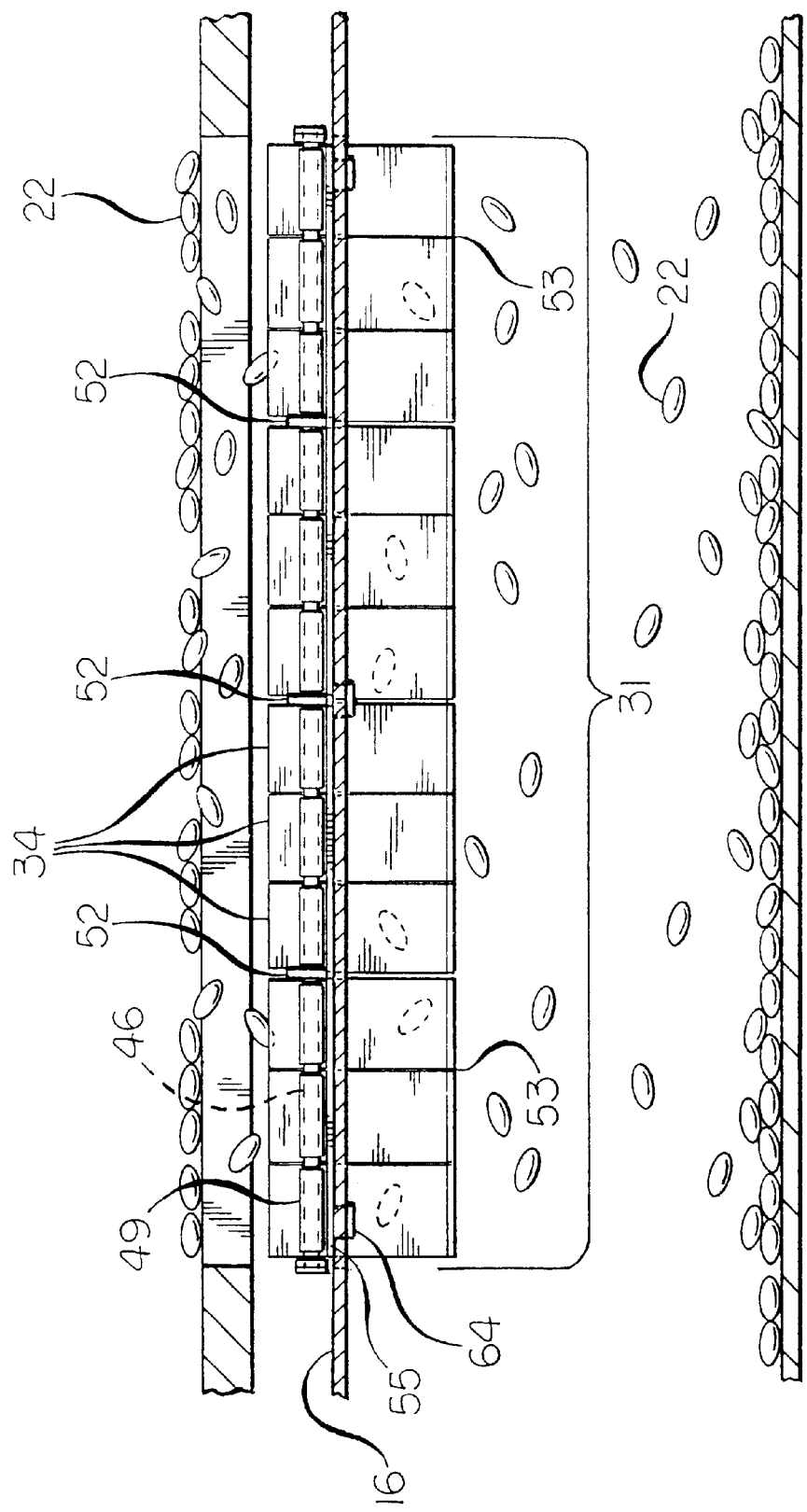
FIG. 4 is a cross-sectional view in elevation of the charge slot air shield apparatus taken along line 4—4 of FIG. 2.

For purposes of clarity, only the main section 66 of the charge slot air shield apparatus 28 is shown in FIG. 4. It includes a series of adjacent moveable doors 34. In a preferred embodiment, a keeper tab 64 is placed at about every 4 to 8 moveable doors 34 to maintain the position of the slot air shield apparatus 28 with respect to the S opening 31. A door support bracket 52 can be placed at about every 2 to 12 moveable doors 34. In a preferred embodiment, the moveable doors 34 are spaced apart from each other to define a small gap 53 between adjacent moveable doors 34. Preferably this gap 53 has a width within the range of from about 1/32 to about 1/8 inch. This gap 53 allows each moveable door 34 to move without contacting the adjacent moveable door 34. The gap allows independent movement of the moveable door 34 and prevents the moveable door 34 from contacting and potentially damaging adjacent structures. Also, independent movement of the moveable door 34 is more effective at reducing ambient air flow into the furnace 10.

Figure 5:
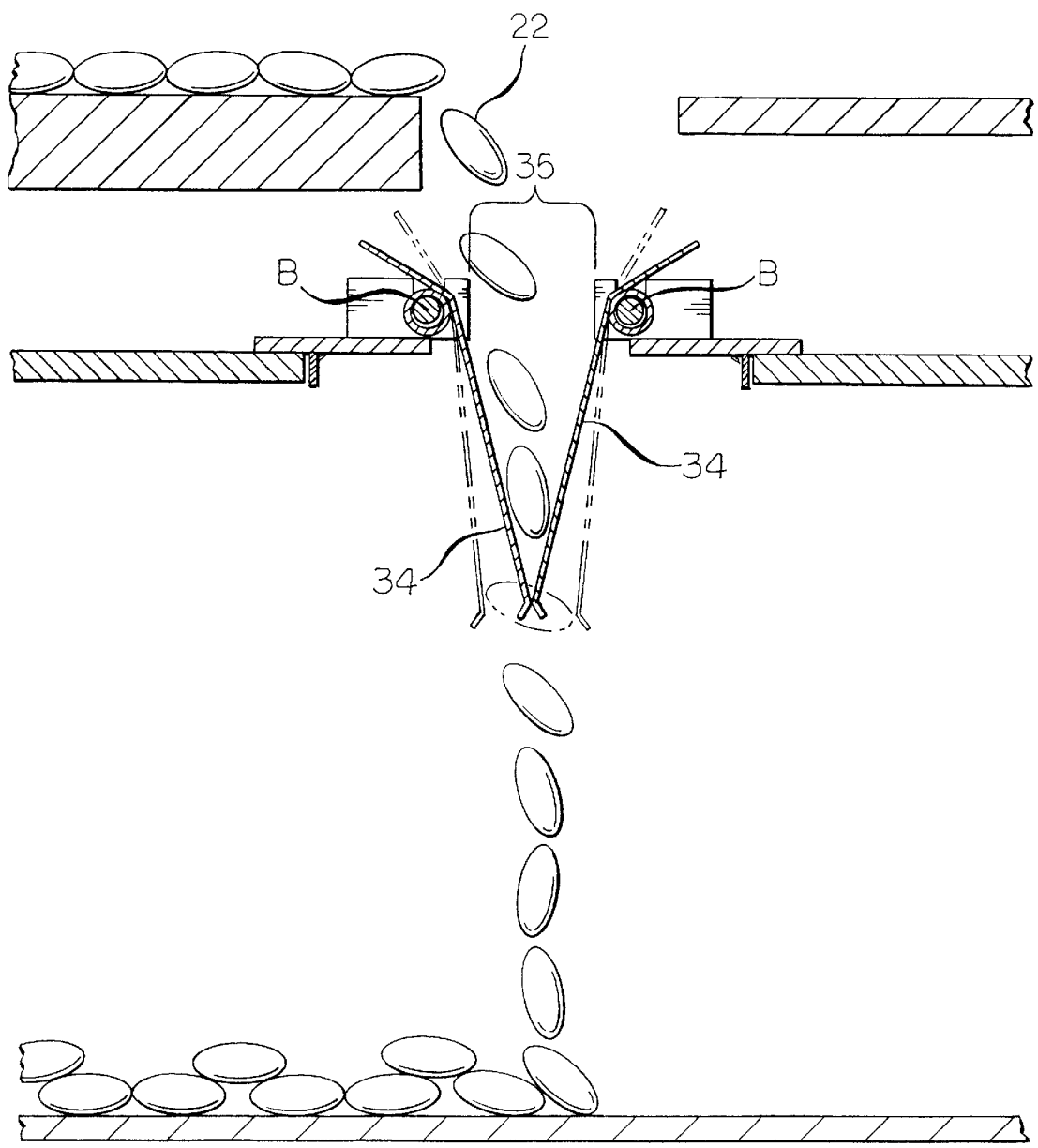
FIG. 5 is similar to FIG. 2, illustrating a different embodiment of the invention.

As shown in FIG. 5, the invention may also be practiced in a different embodiment of the invention where two moveable doors 34 are positioned to contact each other in the closed position. In the embodiment having two moveable doors 34, each moveable doors 34 is structurally similar to the moveable door 34 described in FIG. 2. For example, in a preferred embodiment, each moveable door 34 moves by pivoting about its own pivot point "B." One or both moveable doors 34 will move distally or cease moving proximally, when contacted with the feed material 22 falling through the opening 35.

The principle and mode of operation of this invention have been described in its preferred embodiments. However, it should be noted that this invention may be practiced otherwise than as specifically illustrated and described without departing from its scope.

What is claimed is:

1. An apparatus for charging feed material through an opening into a furnace comprising:
    a fixed structure oriented at an acute angle to the vertical; and
    a moveable door which, together with the fixed structure, defines the opening, the moveable door being mounted for movement toward and away from the fixed structure to widen and narrow the opening, the movable door being pivotally mounted at a pivot point, and the movable door comprising a first leg and a second leg, the first leg being joined with the second leg at approximately the moveable door pivot point, with the weight of the first leg biasing the movable door toward the fixed structure;
    wherein the moveable door and the fixed structure create a V-shaped downwardly pointing channel to direct the feed material being fed through the opening by gravity.

2. The apparatus of claim 1 wherein the furnace is a rotary furnace and wherein the opening is positioned in the roof of the rotary furnace.

3. The apparatus of claim 2 wherein the roof has a gap wider than the opening, and wherein the apparatus further comprises one or more shields which together with the moveable door and fixed structure cover the gap.

4. The apparatus of claim 1 wherein the moveable door is at an angle to the vertical when the door is in a closed position.

5. The apparatus of claim 1 wherein the fixed structure includes a surface that is at an angle to the vertical.

6. The apparatus of claim 1 wherein the moveable door is comprised of one or more pivotally mounted flaps that in the absence of feed material will close and in the presence of feed material will open.

7. An apparatus for charging feed material into a rotary furnace comprising:
    a rotary furnace roof;
    a feed material charger positioned above the rotary furnace roof for charging the feed material to the rotary furnace; and
    an opening in the rotary hearth roof for accepting the feed material into the rotary furnace, the opening being defined by a series of moveable doors together with a fixed structure, the moveable doors being mounted for movement toward and away from the fixed structure to widen and narrow the opening;
    wherein the moveable doors are biased toward the fixed structure.

8. The apparatus of claim 7 wherein the feed material charger is spaced apart from the furnace roof by a distance within the range of from about 3 inches to about 12 inches.

9. The apparatus of claim 7 in which each moveable door is mounted to contact a separate fixed door.

10. The apparatus of claim 7 in which the moveable doors are spaced apart from each other to define a gap between adjacent doors.

11. The apparatus of claim 7 wherein the moveable doors are at an angle to the vertical when the doors in a closed position.

12. The apparatus of claim 7 wherein the fixed structure includes a surface that is at an angle to the vertical.

* * * * *